United States Patent [19]

Iwabuchi

[11] 4,236,565
[45] Dec. 2, 1980

[54] VALVE FOR PNEUMATIC TIRES
[75] Inventor: Kiyoshi Iwabuchi, Tokyo, Japan
[73] Assignee: Dai-Ich Seiko Co., Ltd., Kawaguchi, Japan
[21] Appl. No.: 823,738
[22] Filed: Aug. 11, 1977
[30] Foreign Application Priority Data
Oct. 16, 1976 [JP] Japan .................. 51-139374
[51] Int. Cl.² .............................................. B60C 23/10
[52] U.S. Cl. ................................... 152/427; 152/429; 137/223; 137/234
[58] Field of Search ................ 137/234.5, 223, 234; 152/427, 429

[56] References Cited
U.S. PATENT DOCUMENTS

| | | | |
|---|---|---|---|
| 512,518 | 1/1894 | Palmer | 137/234 |
| 1,174,168 | 3/1916 | Kraft | 137/234 |
| 1,549,213 | 8/1925 | Payne | 137/234 |
| 1,995,100 | 3/1935 | Ingram | 137/223 |
| 3,246,680 | 4/1966 | Boyer | 152/427 |
| 3,318,325 | 5/1967 | Siedow | 137/234.5 |
| 3,421,535 | 1/1969 | Hawkes | 137/234.5 |
| 3,635,275 | 1/1972 | Davis | 152/429 |
| 3,712,326 | 1/1973 | Thacker | 137/223 |

FOREIGN PATENT DOCUMENTS

| | | | |
|---|---|---|---|
| 1078279 | 5/1954 | France | 137/234 |
| 1192300 | 4/1959 | France | 137/234.5 |

*Primary Examiner*—Harold W. Weakley
*Attorney, Agent, or Firm*—Cushman, Darby & Cushman

[57] ABSTRACT

A valve for pneumatic tires comprising a stem made of plastics and having at least one longitudinal groove on its inner surface and a plunger having a flange, which has at least one protuberance, and arranged so that the plunger is inserted to the stem by fitting the protuberance of the flange into the longitudinal groove of the stem and that the number of component parts is small and assembly is easy.

1 Claim, 9 Drawing Figures

VALVE FOR PNEUMATIC TIRES

BACKGROUND OF THE INVENTION (a) Field of the Invention

The present invention relates to a valve for pneumatic tires and, more particularly, to a valve for pneumatic tires for bicycles and automobiles.

(b) Description of the Prior Art

Known valves for pneumatic tires for bicycles and automobiles are constructed, for example, as shown in FIGS. 1 and 2 when a valve of air-pressure measuring type is shown as an example. In these figures, numeral 1 designates a stem, numeral 2 designates a plunger, numeral 3 designates a packing, numeral 4 designates a top nut, and numeral 5 designates a cap-type locking member having a slot 5a at its top. Numerals 6 and 7 respectively designate nuts, numeral 8 designates a washer, and numeral 9 designates a sealing disk made of rubber or the like. The valve constructed as above is mounted to the tire tube by matching the hole 1a, which is formed in the stem 1, to a hole formed in the tire tube and by fixing the bottom surface 9a of the sealing disk 9 to the tire tube surface by a binding agent and is fixed to the rim of the wheel by clamping the rim by the two nuts 6 and 7. To charge air to the tire tube through the abovementioned valve, the top nut 4 is loosened and air is fed from above in FIG. 1. Thus, the plunger 2 is pushed down to cause a gap between the packing 3 and inner surface of the stem 1, and air enters the tube through grooves 4a provided to the top nut 4 and through the above gap. After air is charged, the above-mentioned gap is closed as the plunger 2 is pushed up by the pressure of air in the tube. Besides, by tightening the top nut 4, the packing 3 is tightened by the flange 2c, which is formed round the plunger 2, and inner surface of the stem 1 so that air leakage from the tube is prevented. To measure the air pressure in the tube, the top nut 4 is loosened and the top end of the valve is connected to a measuring instrument. Thus, the plunger is pushed down by the measuring instrument to cause the above-mentioned gap and the air pressure in the tube is measured.

To assemble the above-mentioned valve of air pressure measuring type, the packing 3 and plunger 2 are inserted in turn into the stem 1 through its hole 1a. Then, the locking member 5 is force-fitted into the stem 1 so that the lower portion 2a of the plunger 2 passes through the slot 5a of the locking member 5 so that the plunger 2 will not rotate. After the above, the top nut 4 is screwed onto the threaded portion 2b formed at the upper portion of the plunger 2. Then, the nuts 6 and 7 are screwed onto the stem 1 and the sealing disk 9 is fixed to the stem 1 so that the valve is assembled as shown in FIG. 1.

As explained in the above, for the known valves for pneumatic tires, the number of component parts is large, assembly is not easy and, moreover, the cost of production is high because all component parts are made of metal.

SUMMARY OF THE INVENTION

It is, therefore, a primary object of the present invention to provide a valve for pneumatic tires comprising a stem made of plastics and having at least one longitudinal groove on its inner surface and a plunger having a flange, which has at least one protuberance to be inserted to the above-mentioned groove, and is arranged to insert the plunger to the stem by inserting the protuberance of the flange to the longitudinal groove of the stem so that the plunger will not rotate.

Another object of the present invention is to provide a valve for pneumatic tires comprising a stem made of plastics and having a stepped portion formed at a position near its lower end and is arranged to be fixed to the rim of wheel by means of the above-mentioned stepped portion and nut, which is screwed onto the stem.

DETAILED DESCRIPTION OF THE PREFERRED EMBODIMENTS

Figure 1:
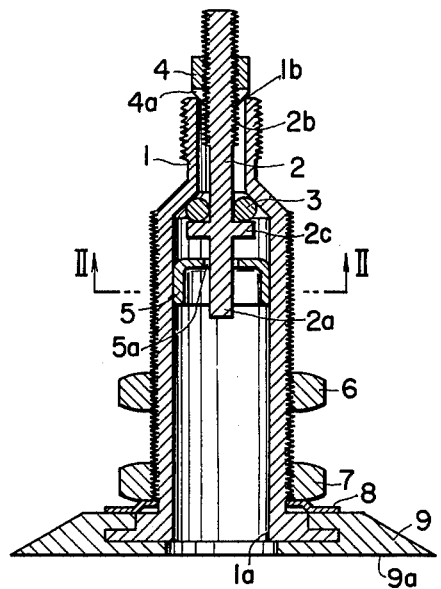
FIG. 1 shows a sectional view of known valve for pneumatic tires of air-pressure measuring type.
Figure 2:
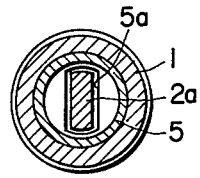
FIG. 2 shows a sectional view taken along the line II—II in FIG. 1.
Figure 3:
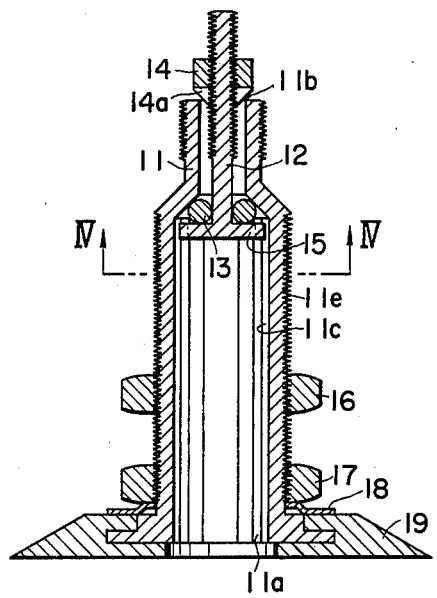
FIG. 3 shows a sectional view of Embodiment 1 of the valve for pneumatic tires according to the present invention.
Figure 4:
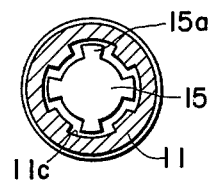
FIG. 4 shows a sectional view taken along the line IV—IV in FIG. 3.

Enbodiment 1 of the valve for pneumatic tires according to the present invention is described below referring to FIGS. 3 and 4. In these figures, numeral 11 designates a stem made of plastic and having at least one longitudinal groove 11c on its inner surface. In Embodiment 1, the stem has four longitudinal grooves as shown in FIG. 4. Numeral 12 designates a plunger having a flange 15, which has at least one protuberance 15a to be inserted to the groove 11c of the stem 11. In Embodiment 1, the flange 15 has four protuberances 15a as shown in FIG. 4. Numeral 13 designates a packing, numeral 14 designates a top nut, numerals 16 and 17 respectively designate nuts which are screwed to the thread 11e of the stem 11, numeral 18 designates a washer and numeral 19 designates a sealing disk made of rubber of the like. As parts designated by numerals 13 through 19 are substantially same as those of known valve shown in FIG. 1, detailed explanation is omitted here. In the present invention, however, the top nut 13 and nuts 16 and 17 may be made of plastics.

To assemble the valve for pneumatic tires constructed as above, the packing 13 is inserted to the stem 1 and, then, the plunger 12 is inserted to the stem 11 so that the protuberances 15a of its flange 15 are located in the longitudinal grooves 11c of the stem 11, i.e., as shown in FIG. 4. After the above, the top nut 14 is screwed onto the thread of the plunger 12. At that time, as the protuberances 15a provided to the flange 15 of the plunger 12 are located in the longitudinal grooves 11c of the stem 11, the plunger does not rotate and it is possible to tighten the top nut 14. The other parts can be assembled in the same way as known valves.

Figure 5:
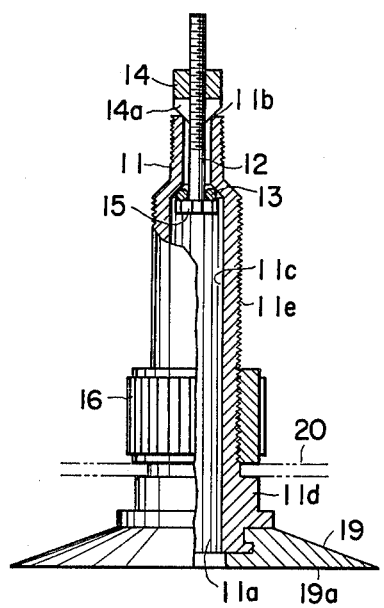
FIG. 5 shows a sectional view of Embodiment 2 of the present invention.

Now, FIG. 5 shows Embodiment 2 of the valve according to the present invention. Embodiment 2 differs from Embodiment 1 only in the fact that the stem 11 has a stepped portion 11d formed at a position near its lower end. The other details are substantially the same as Embodiment 1.

By forming the stepped portion 11d on the stem 11, Embodiment 2 is arranged so that the stem 11 is fixed to the rim 20 by clamping the rim 20 by the stepped portion 11d and nut 16. Thus, the stepped portion 11d of the stem 11 serves in the same way as the nut 17 of Embodiment 1 and the stem 11 is reliably fixed to the rim though the nut 17 is not provided.

Figure 6:
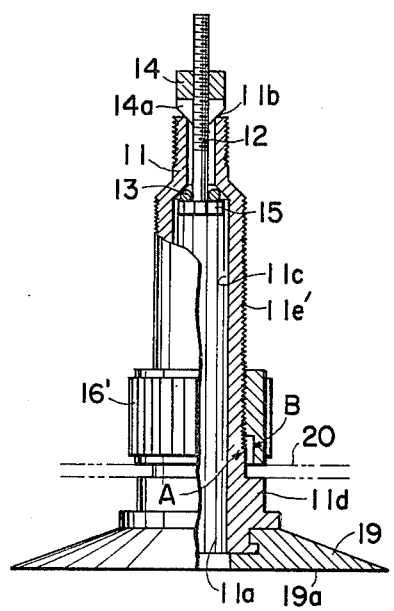
FIG. 6 shows a sectional view of Embodiment 3 of the present invention.

FIG. 6 shows Embodiment 3 of the valve according to the present invention. In Embodiment 3, the stem 11 has the stepped portion 11d in the same way as Embodiment 2. However, the thread 11e' on the outer surface of the stem 11 is provided only to the portion other than the portion A near the stepped portion 11d. In other words, the portion A is not threaded. Besides, the nut 16' to be screwed onto the thread 11e' is formed as a special nut which does not have thread at the portion B. It is preferable that the length of the portion A of the stem where the thread is not formed is made slightly larger than the thickness of the rim 20. Therefore, the thread 11e' formed on the outer surface of the stem is free from wear to be caused by the rim. Besides, as the special nut is used, it is possible to securely clamp the rim 20 by the stepped portion 11d and nut 16' though the stem 11 and nut 16' have portions which are not threaded.

Figure 7:
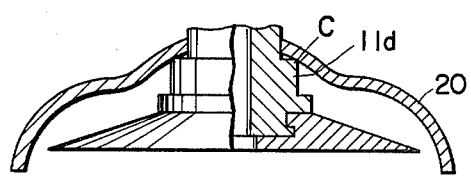
FIG. 7 shows a sectional view illustrating the state that Embodiment 2 of the present invention is mounted to a rim.
Figure 8:
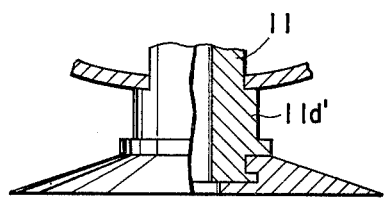
FIGS. 8 and 9 respectively show sectional views of Enbodiment 4 of the present invention.
Figure 9:
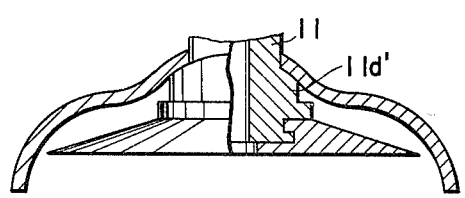

FIGS. 8 and 9 respectively show Embodiment 4 of the valve according to the present invention. In case of the valve having the stepped portion 11d like Embodiments 2 and 3, the stepped portion 11d contacts the rim 20 only by the portion C shown in FIG. 7 due to the fact that the rim 20 of a bicycle is curved as shown in FIG. 7. In Embodiment 4, the stepped portion 11d is formed to have a curved surface which matches the shape of the rim. That is, in the section of the direction shown in FIG. 8, the stepped portion is slightly curved upward toward the outer circumference so that the curve of the stepped portion matches the circular arc of the rim. In the section of the direction shown in FIG. 9, the stepped portion is curved downward toward the outer circumference. By forming the stepped portion 11d as explained in the above, it is possible to fix the stem 11 to the rim more reliably.

As explained in the above, for the valve for pneumatic tires according to the present invention, the stem and some of the other component parts are made of plastics. Besides, the number of component parts is reduced and assembly of the valve is made easier. Moreover, in cases of valves according to Embodiments 2 through 4, the stepped portion is formed at the position near the lower end of the stem so that the number of component parts is further reduced. At the same time, as the stepped portion is provided, the strength of the stem is increased and sufficient strength is obtained even when the stem is made of plastics.

I claim:
1. In a valve for a pneumatic tire for mounting on a tire rim through an opening provided through the tire rim at a site where the tire rim is circular and generally convex radially outwards as viewed in longitudinal cross-section and where the tire rim is generally concave radially outwards as viewed in transverse radial cross-section;
wherein the valve includes:
a tubular stem having a bore with a generally coaxially annular constriction therein providing a valve seat;
an annular sealing disk generally coaxially secured on the tubular stem to radiate outwardly therefrom at one end thereof so that radially inside the rim the tubular stem may be sealingly secured to an air-containing body, with an outer end portion of the tubular stem projecting out through said tire rim opening;
a first radial enlargement and a second radial enlargement being provided in tandem on said stem, the first one being disposed nearer said annular sealing disk and being designed to abut the rim at least generally perimetrically of said opening, and the second one being threadably mounted on the exterior of the stem and being designed to be threaded towards said first radial enlargement after the tubular stem outer end portion has been projected out through said rim opening in order to trap the rim between said first and second radial enlargements and thus secured the valve to the rim;
a valve body including a flange portion provided as an enlargement on a rod portion, and an annular packing ring, said valve body being slidably received in the bore of said tubular stem with said flange being located axially inwards of said valve seat, said rod passing axially out of said tubular stem beyond said valve seat and said annular packing ring being generally coaxially received on said rod between said flange and said valve seat, so that when said valve rod is pushed axially inwards said valve is open between said rod and said seat past said flange and said annular packing ring, but when said flange is pushed axially outwards, said flange urges said annular packing ring into sealing relation between said valve seat and said flange;
enlargement means being provided on said valve rod axially beyond said tubular valve stem, which is engageable with said tubular valve stem to limit axially inward travel of said valve rod by abutment of said enlargement means with said tubular valve stem,
the improvement wherein:
said tubular valve stem is an integrally molded member made of synthetic plastics material said bore of which is provided with a non-circular transverse cross-sectional shape of at least generally constant size in at least a portion thereof extending axially inwards of said valve seat so as to provide at least one radially inwardly opening, axially extending relatively grooved site angularly adjacently alternating with at least one relatively radially inwardly protuding site; and
said flange of said valve body having a radially outerperipheral surface of a non-circular section that is at least generally complementary to said shape of said stem bore portion and at least one relative protuberance receiving said relatively groove site of said stem bore portion, the valve body thus being intercalated with the tubular valve stem for non-rotative axial sliding with respect thereto;
said first radial enlargement on said tubular valve stem being integrally provided as a stepped portion thereon;
said stepped portion of said tubular valve stem being delineated axially outwardly by an annular shoulder which at least generally matches said circular convexity and radially outward concavity of the rim at said site.

* * * * *